UNITED STATES PATENT OFFICE.

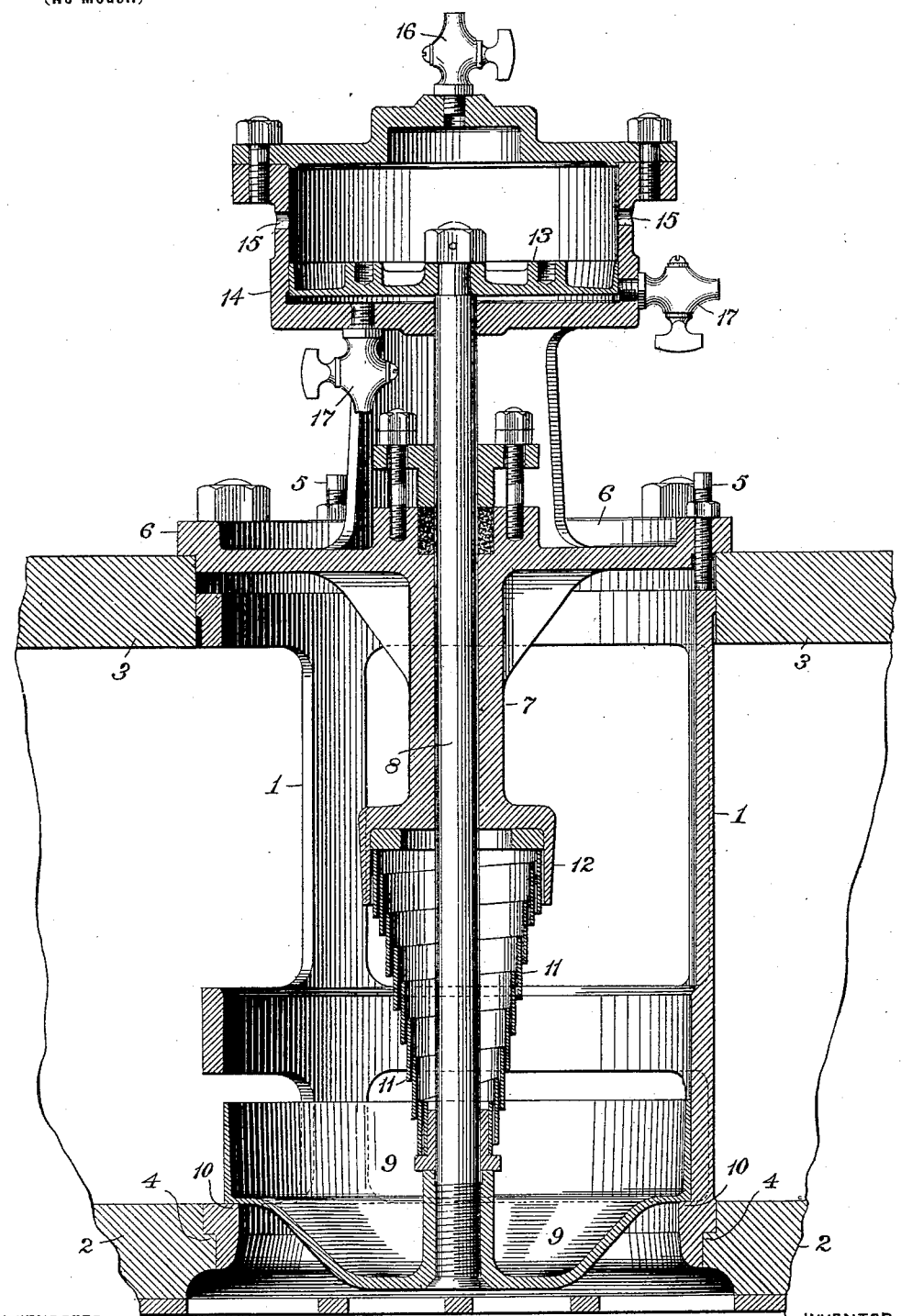

JAMES HEMPHILL, OF PITTSBURG, PENNSYLVANIA.

VALVE FOR AIR-COMPRESSORS.

SPECIFICATION forming part of Letters Patent No. 632,490, dated September 5, 1899.

Application filed July 11, 1898. Serial No. 685,579. (No model.)

*To all whom it may concern:*

Be it known that I, JAMES HEMPHILL, a citizen of the United States, residing at Pittsburg, in the county of Allegheny and State of Pennsylvania, have invented or discovered certain new and useful Improvements in Valves for Air-Compressors, of which improvements the following is a specification.

The invention described herein relates to certain improvements in valves for blowing-engines, and has for its object a construction whereby the movements of the valve may be controlled or regulated so as to prevent the excessive hammering incident to the valves now in use.

In general terms the invention consists in the construction and combination substantially as hereinafter more fully described and claimed.

In the accompanying drawing, forming a part of this specification, is shown a sectional elevation of my improved valve.

In the practice of my invention an open grid or guide frame 1 is arranged transversely across the air-chamber, formed by the inner and outer heads 2 and 3 of the blowing-cylinder. The ends of the grid or guide frame project into openings formed through the heads 2 and 3, and a shoulder 4 on its inner end is held against a seat formed around the opening through the head 2 by set-screws 5, passing through the cap-plate 6 and bearing against the outer end of the grid or guide frame. The cap-plate 6 is bolted over the opening through the outer head 3 and is provided with a hollow boss or sleeve 7, which serves as a guide for the stem 8 of the valve 9, secured to the inner end of the stem. The valve is yieldingly held to the seat, formed by an inwardly-projecting shoulder 10 on the grid or guide frame 1, by a spring 11, which bears at one end against the valve and has its opposite end seated in a socket 12, formed on the end of the boss 7.

In order to prevent the hammering of the valve due to its sudden opening by the air-pressure in the cylinder and to the closing action of the spring when pressures in the cylinder and air-chamber are equalized, the valve is connected to a cushioning mechanism which is constructed as hereinafter described. The outer end of the valve-stem 8 is secured to a piston 13, arranged to operate within a cylinder 14. This cylinder is formed on or connected to the cap-plate 6. This cylinder is provided within its walls with openings 15 for the escape of air as the piston is shifted by the valve 9 in its opening movement, and the holes are so located with reference to the traverse of the piston as to be closed by the piston just before the valve has reached the desired limit of its opening movement. The further movement of the piston will be resisted by the air confined between the piston and the end of the cylinder. The air thus confined is prevented from acting to force the valve toward its seat before the pressures in the blowing-cylinder and air-chamber are equalized by permitting a regulated escape of the air-cushion through a petcock 16 or other suitable regulating device. By suitably adjusting the petcock the movement of the piston 13 will be gradually checked and there will not be any material pressure against the piston when stopped tending to close the valve. It will be readily understood that the ports or openings 15 will permit the desired quick opening of the valve.

The movement of the valve as it approaches its seat under the action of the spring 11 is checked and regulated by means of one or more petcocks or valves 17, which are properly adjusted to control the escape of air, forming a cushion between the piston 13 and the inner end of the cylinder 14 during the closing movement of the valve.

It is characteristic of my improvement that the valve is held closed by its spring until a predetermined pressure has been produced in the cylinder and that as soon as such pressure is reached the valve will be automatically shifted, and as soon as pressures in the cylinder and air-receiver are equalized the valve will be quickly closed by the spring. It is further characteristic of my improvement that although the opening and closing movements of the valve are quick and full all hammering or jarring is prevented without any material interference with such prompt movements.

I claim herein as my invention—

The combination of a valve, a spring for holding the valve on its seat during the normal operation of the compressor, a cylinder having its piston connected to the valve said cylinder being provided with one or more ports permitting the free escape of air during a portion of the movement of the piston and with a valved port for the regulated escape of air during the final movement of the piston, substantially as set forth.

In testimony whereof I have hereunto set my hand.

JAMES HEMPHILL.

Witnesses:
F. E. GAITHER,
DARWIN S. WOLCOTT.